(12) United States Patent
Quadracci et al.

(10) Patent No.: US 9,501,455 B2
(45) Date of Patent: Nov. 22, 2016

(54) SYSTEMS AND METHODS FOR PROCESSING DATA

(75) Inventors: Leonard Jon Quadracci, Seattle, WA (US); Kyle M. Nakamoto, Bellevue, WA (US); Brian Warn, Seattle, WA (US)

(73) Assignee: The Boeing Company, Chicago, IL (US)

( * ) Notice: Subject to any disclaimer, the term of this patent is extended or adjusted under 35 U.S.C. 154(b) by 955 days.

(21) Appl. No.: 13/173,028

(22) Filed: Jun. 30, 2011

(65) Prior Publication Data

US 2013/0006610 A1 Jan. 3, 2013

(51) Int. Cl.
*G06F 17/27* (2006.01)
*G06F 17/21* (2006.01)

(52) U.S. Cl.
CPC ......... *G06F 17/218* (2013.01); *G06F 17/2775* (2013.01)

(58) Field of Classification Search
CPC .... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775
USPC ............................ 704/1, 9, 10; 707/706–708
See application file for complete search history.

(56) References Cited

U.S. PATENT DOCUMENTS

| | | | |
|---|---|---|---|
| 7,027,974 B1 * | 4/2006 | Busch | G06F 17/271 704/4 |
| 7,769,628 B2 | 8/2010 | Mathews et al. | |
| 7,831,559 B1 * | 11/2010 | Mohan et al. | 707/638 |
| 7,890,514 B1 * | 2/2011 | Mohan et al. | 707/748 |
| 8,239,425 B1 * | 8/2012 | Bell | G06F 17/30705 706/12 |
| 2003/0154071 A1 * | 8/2003 | Shreve | 704/9 |
| 2004/0024760 A1 * | 2/2004 | Toner | G06F 17/30985 |
| 2005/0278362 A1 * | 12/2005 | Maren et al. | 707/100 |

(Continued)

FOREIGN PATENT DOCUMENTS

| | | |
|---|---|---|
| EP | 0520684 A2 | 12/1992 |
| JP | 2001290801 A | 10/2001 |
| JP | 2009294950 A | 12/2009 |

OTHER PUBLICATIONS

JPO Office Action for related application 2012-148194 issued Dec. 1, 2015; 2 pp.

*Primary Examiner* — Lamont Spooner
(74) *Attorney, Agent, or Firm* — Armstrong Teasdale LLP

(57) ABSTRACT

A method for processing at least partially unstructured data is provided. The method includes receiving, at a data processing tool, at least partially unstructured data from at least one data source, and processing the at least partially unstructured data to generate at least partially structured data that includes tagged data, wherein processing the at least partially unstructured data includes at least one of processing the at least partially unstructured data using an associative memory application, and processing the at least partially unstructured data using a regular expression processing program. The method further includes transmitting the at least partially structured data to a main application, and incorporating the at least partially structured data into the main application based at least in part on the tagged data, wherein incorporating the at least partially structured data includes at least one of including and excluding data based on the existence, content and/or type of a tag.

20 Claims, 13 Drawing Sheets

(56) References Cited

U.S. PATENT DOCUMENTS

| | | | |
|---|---|---|---|
| 2006/0224682 A1* | 10/2006 | Inmon | G06F 17/27 709/206 |
| 2007/0244892 A1* | 10/2007 | Narancic | 707/7 |
| 2008/0040316 A1* | 2/2008 | Lawrence | G06F 17/30699 |
| 2008/0044016 A1* | 2/2008 | Henzinger | G06F 17/2211 380/201 |
| 2008/0114725 A1* | 5/2008 | Indeck et al. | 707/2 |
| 2008/0189260 A1 | 8/2008 | Arnold et al. | |
| 2008/0313143 A1 | 12/2008 | Warn et al. | |
| 2008/0320042 A1 | 12/2008 | Arnold et al. | |
| 2009/0119268 A1* | 5/2009 | Bandaru et al. | 707/3 |
| 2009/0144295 A1* | 6/2009 | Mion et al. | 707/100 |
| 2009/0204507 A1* | 8/2009 | Cockayne et al. | 705/26 |
| 2009/0204610 A1* | 8/2009 | Hellstrom | G06F 17/30 |
| 2009/0300482 A1* | 12/2009 | Summers et al. | 715/234 |
| 2010/0114899 A1* | 5/2010 | Guha et al. | 707/741 |
| 2010/0205121 A1 | 8/2010 | Quadracci et al. | |
| 2010/0205192 A1 | 8/2010 | Quadracci et al. | |
| 2010/0205212 A1 | 8/2010 | Quadracci et al. | |
| 2010/0228693 A1* | 9/2010 | Dawson et al. | 706/12 |
| 2010/0257006 A1 | 10/2010 | Quadracci et al. | |
| 2010/0268673 A1 | 10/2010 | Quadracci | |
| 2010/0306249 A1* | 12/2010 | Hill | G06F 17/30867 707/769 |
| 2011/0295854 A1* | 12/2011 | Chiticariu et al. | 707/737 |
| 2011/0307356 A1* | 12/2011 | Wiesinger | G06Q 30/06 705/27.1 |
| 2012/0089620 A1* | 4/2012 | Castellanos et al. | 707/749 |
| 2012/0101860 A1* | 4/2012 | Ezzat | 705/7.11 |
| 2012/0203747 A1* | 8/2012 | Douetteau et al. | 707/696 |
| 2012/0203752 A1* | 8/2012 | Ha-Thuc | G06F 17/30705 707/706 |
| 2012/0278336 A1* | 11/2012 | Malik et al. | 707/748 |
| 2014/0188919 A1* | 7/2014 | Huffman | G06F 17/30864 707/758 |

* cited by examiner

Henry David Thoreau (b. 1817, d. 1862). This eccentric American author and naturalist was born at Concord, Mass. He graduated at Harvard University in 1837. He was a good English and classical scholar, and was well acquainted with the literature of the East. His father was a maker of lead pencils, and he followed the business for a time, but afterwards supported himself mainly by teaching, lecturing, land surveying, and carpentering. In 1845 he built himself a small wooden house near Concord, on the shore of Walden Pond, where he lived about two years. The distance from his porch to the water's edge was 1234-1255 feet depending upon the height of the lake on any given year. The current caretaker of his estate recently installed a Kohler K-2345-1 model sink. The part number of the sink is 2345-1. He was intimate with Hawthorne, Emerson, and other literary celebrities. His principle works are "Walden, or Life in the Woods," "A Week on Concord and Merrimac Rivers," "Excursions," "Maine Woods," "Cape Cod," "A Yankee in Canada," and "Letters to Various Persons." In descriptive power Mr. Thoreau has few, if any, superiors.

Henry David Thoreau (b. 1817, d. 1862). This eccentric American author and naturalist was born at Concord, Mass. He graduated at Harvard University in 1837. He was a good English and classical scholar, and was well acquainted with the literature of the East. His father was a maker of lead pencils, and he followed the business for a time, but afterwards supported himself mainly by teaching, lecturing, land surveying, and carpentering. In 1845 he built himself a small wooden house near Concord, on the shore of Walden Pond, where he lived about two years. The distance from his porch to the water's edge was 1234-1255 feet depending upon the height of the lake on any given year. The current caretaker of his estate recently installed a Kohler K-2345-1 model sink. The part number of the sink is 2345-1. He was intimate with Hawthorne, Emerson, and other literary celebrities. His principle works are "Walden, or Life in the Woods," "A Week on Concord and Merrimac Rivers," "Excursions," "Maine Woods," "Cape Cod," "A Yankee in Canada," and "Letters to Various Persons." In descriptive power Mr. Thoreau has few, if any, superiors.

[author]Henry David Thoreau[/author] (b.[year] 1817[/year], d. [year] 1862[/year]). This eccentric American author and naturalist was born at [city] Concord[/city], Mass. He graduated at [college_name] Harvard University[/college_name] in [year]1837[/year]. He was a good English and classical scholar, and was well acquainted with the literature of the East. His father was a maker of lead pencils, and he followed the business for a time, but afterwards supported himself mainly by teaching, lecturing, land surveying, and carpentering. In [year]1845[/year] he built himself a small wooden house near [city]Concord[city], on the shore of Walden Pond, where he lived about two years. The distance from his porch to the water's edge was [part_number]1234-1[/part_number]255 feet depending upon the height of the lake on any given year. The current caretaker of his estate recently installed a Kohler K-[part_number]2345-1[/part_number] model sink. The part number of the sink is [part_number]2345-1[/part_number]. He was intimate with [author]Hawthorne[/author], [author]Emerson[/author], and other literary celebrities. His principle works are "[book_title]Walden, or Life in the Woods[/book_title]," "[book_title]A Week on Concord and Merrimac Rivers[/book_title]," "[book_title]Excursions[/book_title]," "[book_title]Maine Woods[/book_title]," "[book_title]Cape Cod[/book_title]," "[book_title]A Yankee in Canada[/book_title]," and "[book_title]Letters to Various Persons[/book_title]." In descriptive power Mr. [author]Thoreau[/author] has few, if any, superiors.

Figure 2D

[author][i01]Henry David Thoreau[/author] (b.[year][i03]1817[/year], d. [year][i03]1862[/year]). This eccentric American author and naturalist was born at [city][i04]Concord[/city], Mass. He graduated at [college_name][i18]Harvard University[/college_name] in [year][i03]1837[/year]. He was a good English and classical scholar, and was well acquainted with the literature of the East. His father was a maker of lead pencils, and he followed the business for a time, but afterwards supported himself mainly by teaching, lecturing, land surveying, and carpentering. In [year][i03]1845[/year] he built himself a small wooden house near[city][i04]Concord[/city], on the shore of Walden Pond, where he lived about two years. The distance from his porch to the water's edge was [part_number][i05][i14]1234-1[/part_number]255 feet depending upon the height of the lake on any given year. The current caretaker of his estate recently installed a Kohler K-[part_number][i05]2345-1[/part_number] model sink. The part number of the sink is [part_number][i05]2345-1[/part_number]. He was intimate with [author][i01]Hawthorne[/author], [author][i01]Emerson[/author], and other literary celebrities. His principle works are "[book_title][i01]Walden, or Life in the Woods[/book_title]," "[book_title][i02]A Week on Concord and Merrimac Rivers[/book_title]," "[book_title][i02]Excursions[/book_title]," "[book_title][i01]Maine Woods[/book_title]," "[book_title][i02]Cape Cod[/book_title]," "[book_title][i01]A Yankee in Canada[/book_title]," and "[book_title][i01]Letters to Various Persons[/book_title]." In descriptive power Mr. [author][i01]Thoreau[/author] has few, if any, superiors.

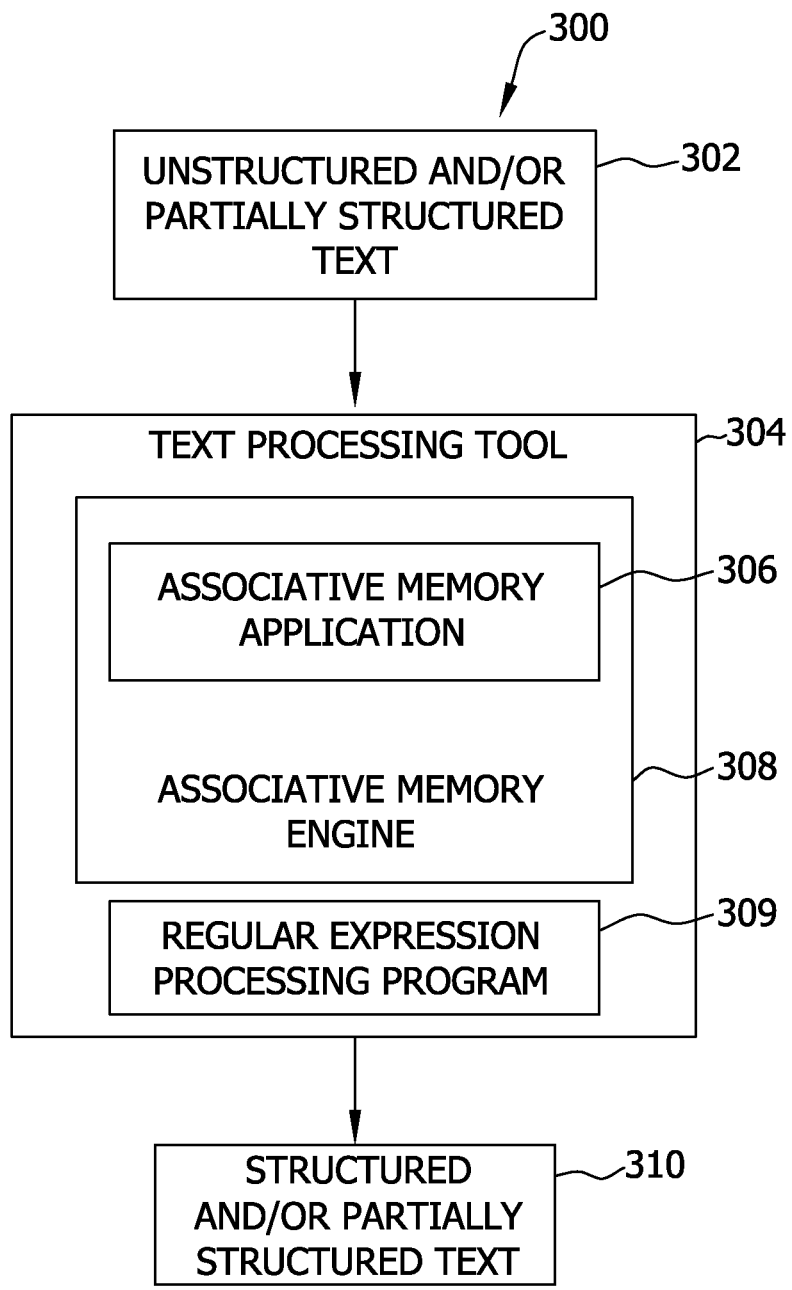

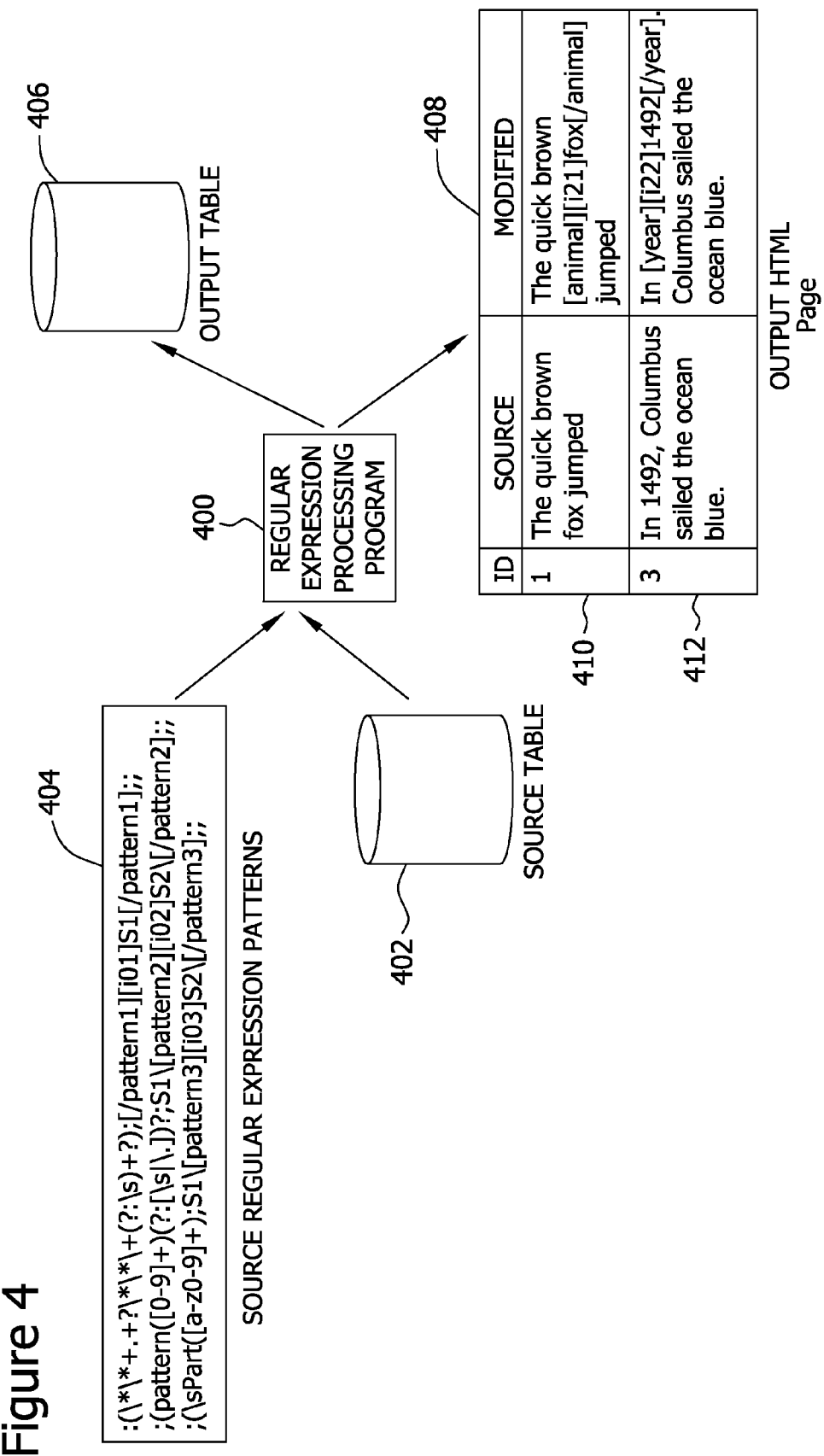

THE BOEING COMPANY

SUBJECT: Inspections of carriage spindle of outboard mid-flaps-FAA Proposed Rule Withdrawal Summary:
The following is a notification of ref/a/Proposed Rule Withdrawal Docket Number 2002-NM-219-AD. Since the issuance of the supplemental NPRM, the Federal Aviation Administration (FAA) has issued another AD that adequately addresses the identified unsafe condition. Accordingly, the proposed rule is withdrawn.

This action withdraws a supplemental notice proposed rulemaking (NPRM) that proposed a new airworthiness directive (AD), applicable to all Boeing Model 737-100,-200,-200C,-300,-400 and -500 series airplanes. That action would have superseded an existing AD that currently requires repetitive inspections to find cracks, fractures, or corrosion of each carriage spindle of the left and right outboard mid-flaps; and corrective action, if necessary. That action would also have mandated the previously optional overhaul or replacement of the carriage spindles, which would have ended the repetitive inspections required by the existing AD.

804

The complete text of the subject Proposed Rule withdrawal was noted in the Federal Register and will be accessible via the following World Wide Web address:

http: www.gpoaccess.gov/fr/browse.html

806

[boilerplate]
If you need further information regarding the subject, please direct your request to your local Boeing Field Service Representative. If your local Field Service Representative is not available you may contact Airline Support Manager at the address noted on the top of this message or call (123) 456-7890.

John V. President
Vice President, Fleet and Airline Support

Boeing
Commercial Aviation Services [/boilerplate]

SYSTEMS AND METHODS FOR PROCESSING DATA

BACKGROUND

The field of the disclosure relates generally to data analysis, and more specifically, to processing unstructured data and/or partially structured data to generate structured data for processing by an application. As used herein, unstructured data refers to data free-form and variable based upon the syntax/language of the person that generated the data.

In data analysis systems, data, such as unstructured text and/or partially structured text or other data types, for example, alphanumeric strings and non-alphanumeric data (images, metadata and the like) often needs to be processed and/or organized into a more structured form before being added into the system. However, it may be difficult and time consuming to identify, parse, and extract relevant information from the unstructured text and/or partially structured data. Using generic parsers and/or extractors to identify this information, data may be ignored, misidentified, and/or inappropriately deconstructed. To correct these errors, application-specific code is often written to properly identify the information. However, writing and implementing this specialized code may be time consuming, and the resulting code may only be applicable to a particular situation. Further, periodically updating the source of the unstructured text and/or partially structured data exacerbates these issues, as it introduces new situations that may require further specialized code. Further, the specialized code can generally be written and updated only by experienced personnel.

Natural language methods may also be implemented to process and/or organize the unstructured data and/or partially structured data. However, depending on the source of the unstructured data and/or partially structured data, natural language may not be effective in organizing the unstructured data and/or partially structured data. Further natural language methods may require an ontology expert and a data mining expert for proper programming and updating. Finally, artificial intelligence tools such as rule based systems, neural networks, and/or Bayesian networks may be used to process and/or organize the unstructured data and/or partially structured data. However these systems also require experienced personnel for implementation and/or updating.

BRIEF DESCRIPTION

In one aspect, a method for processing at least partially unstructured data is provided. The method includes receiving, at a data processing tool, at least partially unstructured data from at least one data source, and processing the at least partially unstructured data to generate at least partially structured data that includes tagged data, wherein the tagged data includes at least one term of interest, and wherein processing the at least partially unstructured data includes at least one of processing the at least partially unstructured data using an associative memory application, and processing the at least partially unstructured data using a regular expression processing program. The method further includes transmitting the at least partially structured data to a main application, and incorporating the at least partially structured data into the main application based at least in part on the tagged data, wherein incorporating the at least partially structured data includes at least one of including and excluding data based on the existence, content and/or type of a tag.

In another aspect, one or more computer-readable storage media having computer-executable instructions embodied thereon are provided. When executed by at least one processor, the computer-executable instructions cause the at least one processor to receive, at a data processing tool, at least partially unstructured data from at least one data source, and process the at least partially unstructured data to generate at least partially structured data that includes tagged data, wherein the tagged data includes at least one term of interest, and wherein to process the at least partially unstructured data, the computer-executable instructions cause the processor to at least one of process the at least partially unstructured data using an associative memory application, and process the at least partially the unstructured data using a regular expression processing program. The instructions further cause the at least one processor to transmit the at least partially structured data to a main application, and incorporate the at least partially structured data into the main application based at least in part on the tagged data, wherein incorporating the at least partially structured data includes at least one of including and excluding data based on the existence of a tag.

In yet another aspect, a system for processing at least partially unstructured data is provided. The system includes a processing device, a user interface communicatively coupled to the processing device, and at least one of a memory communicatively coupled to the processing device and a communications interface communicatively coupled to the processing device. The processing device is programmed to receive the at least partially unstructured data from at least one of the memory and the communications interface, process the at least partially unstructured data using a data processing tool executing thereon to generate at least partially structured data that includes tagged data including at least one term of interest by at least one of processing the at least partially unstructured data using an associative memory application executing thereon, and processing the at least partially unstructured data using a regular expression processing program executing thereon, and incorporate the at least partially structured data into a main application based on the tagging, wherein incorporating the at least partially structured data includes at least one of including and excluding data based on the existence of a tag.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

FIGS. 2A-2D are diagrams illustrating the methodology shown in FIG. 1.

FIG. 3 is a flow diagram of an exemplary methodology for tagging unstructured text to generate structured text.

FIG. 4 is a diagram illustrating an exemplary method of tagging unstructured text using a regular expression processing program.

FIGS. 8A-8C are embodiments of an exemplary user interface for identifying and selecting misidentified text.

DETAILED DESCRIPTION

Figure 1:
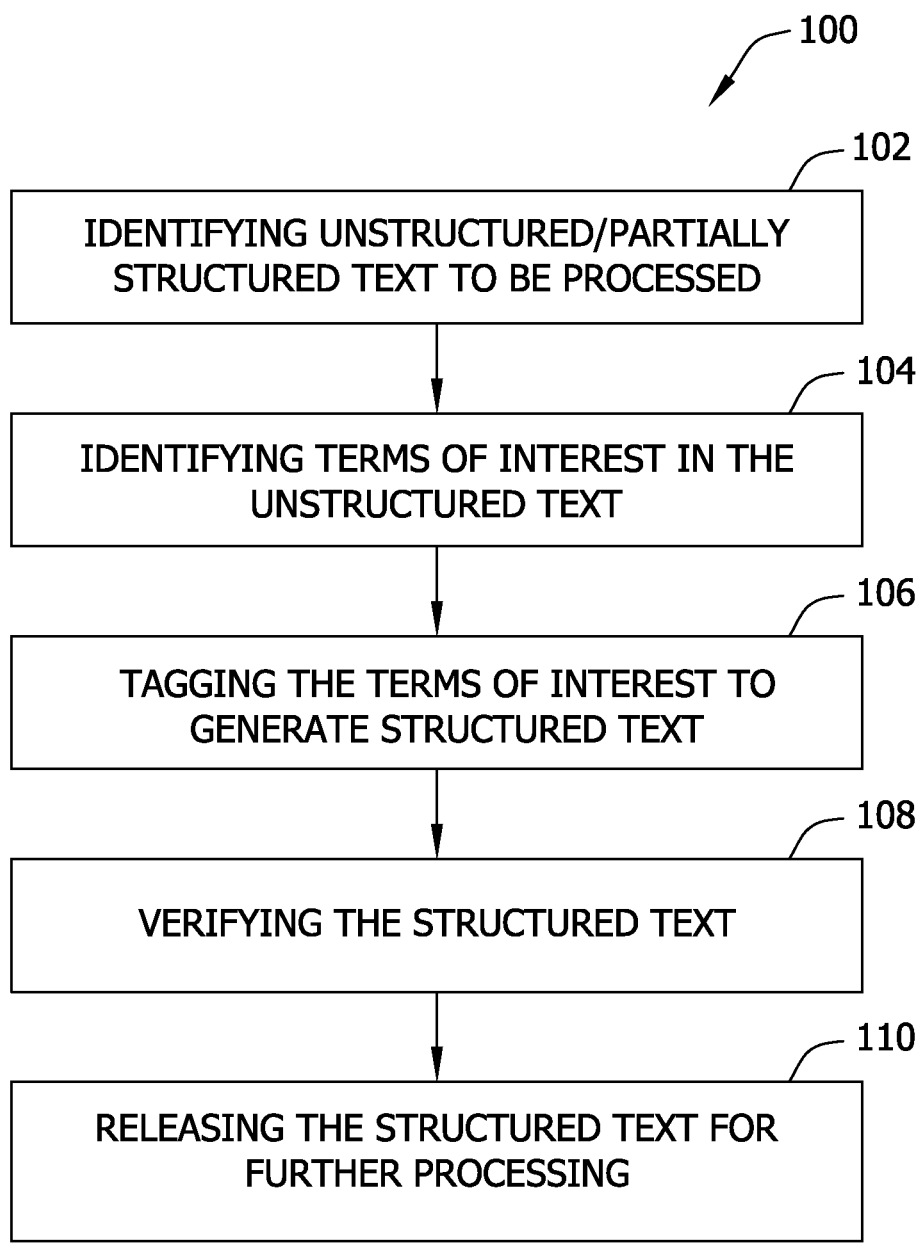
FIG. 1 is a flowchart of a methodology for the processing of text.

The methods and systems described herein are related to the identification of items of interest that might be found within a data source (e.g., textual document, database field, etc.). While the examples and embodiments described herein are directed to the processing of text, it should be understood that the embodiments should not be construed to be so limited. Text processing examples and embodiments are described for clarity. The examples used herein should not be considered limiting. Rather, the embodiments should be considered as being directed to the processing of data, including one or more of text, alphanumeric data, embedded objects, images, metadata, and the like.

The methods and systems therefore relate to, for example, the use of a data processing tool to provide tagging of data which provides a "structure" to the data, as well as verification of any structuring of the data that occurred during the processing. While further described herein, it should be understood that the embodiments not only relate to the "structuring" of unstructured data within the documents, but also to the further structuring of documents that contain partially structured data. To further clarify, as used herein, unstructured data refers to data, such as text, typically entered by a person, that is free-form and variable based upon the syntax/language of the person. For example, email and notes fields will typically enable a user to enter a free-form response. Further, as used herein, structured data is referred to as structured and/or partially-structured if information in the data is tagged or otherwise called out in an organized way. The aforementioned addition of tags to items of interest within a document is analogous to structuring of the data within the document.

Such embodiments provide improved efficiency and performance over existing data processing methods. As further described herein, items of interest within data may be identified, structured through tagging, and verified, using one or both of an associative memory application and/or a regular expression processing program. The associative memory comprises a plurality of data and a plurality of associations among the plurality of data. An associative memory application also referred to as an associative memory is created by incorporating data sources together using an associative memory engine. The associative memory engine is the application that controls the creation, maintenance and accessing of the associative memory similar to how database software controls multiple databases. The associative memory includes entities and attributes that are related to and/or associated with other entities and attributes. An entity is an instance in the associative memory of a particular item of interest, and an attribute is a property and/or description of an associated entity. The associative memory remembers attributes, entities and the associations between them.

Further, after the unstructured data and/or partially structured data is processed into data that is further structured, any data that has been misidentified by the data processing tool can be identified. Such instances of misidentified (incorrectly tagged) data are used to improve and refine the ability of the data processing tools in the identification, processing, and verification of further data samples. As used herein, misidentified data refers to data that was incorrectly tagged and/or incorrectly not tagged (i.e., unidentified data that should have been tagged during processing, but was not such as data that was not previously identified as needing to be tagged, but which is later discovered to need tagging).

Further, in some embodiments, a user interface enables users to identify and select the misidentified data without requiring that users be experienced in sophisticated data processing methods and systems and/or associative memory systems and regular expression processing programs. As at least some of the methods and systems described herein do not require dedicated personnel to maintain and/or update the data processing tool, the methods and systems described herein facilitate reducing costs associated with known data analysis systems.

FIG. 1 is a flowchart illustrating a methodology 100 for the processing of text. The methodology 100 includes identifying 102 the text to be processed, for example, unstructured text and/or partially structured text as defined above. Terms of interest are identified 104 in the unstructured text and/or partially structured text. For example, in one embodiment, a customer may visually identify 104 the terms of interest to a data analyst. The terms of interest are then tagged 106 to at least partially structure the text. The terms of interest may be tagged 106 using a manual or automated process.

The resulting structured text (and/or the partially structured text) including the tags that provide the structure to the text, (as further described below), is verified 108. Verification 108 may include displaying structured text on a user interface coupled to one or more components of a text processing system and observing the various tags that provide the structure to the text. By observing such tags, it can quickly be verified whether the unstructured and/or partially structured text was tagged properly. Further, in some embodiments, any text that has been incorrectly tagged or not tagged can be selected by a user and used to update one or more of the text processing tools being utilized. After the structured text is verified 108, the structured text is released 110 for further processing. The released text may be transmitted to any suitable data-mining and/or data processing application that processes and/or incorporates the structured text based on the tagging. For example, the structured text may be transmitted to a main application as further described below.

FIGS. 2A-2D are diagrams illustrating an exemplary methodology of processing unstructured text and/or partially structured text by identifying terms of interest and tagging them accordingly, thereby providing structure, or additional structure, to the text. The methodology may be implemented using various text processing methods and systems. FIG. 2A includes a sample of unstructured text 202 in its original form. Unstructured text 202, and/or partially structured text (not shown in FIG. 2) may be stored, for example, in a data source. In FIG. 2B, for clarity, a number of terms of interest 204 within the unstructured text 202 are shown in a bold font. In the exemplary embodiment, terms of interest 204 include authors, years, college names, cities, part numbers, and book titles in the unstructured text 202. In embodiments where a text sample includes partially unstructured text, some of the terms of interest may already be tagged. For instance, authors and years may have previously been tagged, but college names may still need to be tagged. Alternatively, terms of interest 204 may include any category and/or type of term within unstructured text and/or partially structured text that might be identified and processed through tagging as described herein. For example, in specific embodiments discussed herein, terms of interest 204 include animals, dates, and/or boilerplate text. It should be understood that "boilerplate" is a general term describing categories of text based upon the application area that are often similar in style, format, and/or content, especially when the text is created by multiple sources. In one application area, boilerplate includes signature blocks, legal disclaimers, proprietary markings, and/or teleconferencing information. While often referred to herein as text, it should be noted that boilerplate may also include one or more of alphanumeric data, embedded objects (images, metadata, etc.). In one embodiment, a customer visually identifies terms of interest 204 in the unstructured text and/or partially structured text 202.

Once terms of interest 204 are identified, terms of interest 204 are tagged, which results in the structuring and/or partial structuring of the text 202. In the exemplary embodiment, the customer visually identifies terms of interest 204, for example, using a user interface. The user interface may be coupled to one or more components of a text processing system. In one embodiment, the customer describes the terms of interest 204 to a data analyst. To determine if additional terms of interest 204 should be tagged, to further structure the text, the data analyst may discuss patterns and/or terms in unstructured text and/or partially structured text 202 with the customer. The data analyst then tags the additional terms of interest 204 using the same user interface, or a separate user interface coupled to one or more components of the text processing system.

Alternatively, terms of interest 204 may be tagged by an automated process to structure and/or partially structure the text. In one embodiment, an automated process crawls through a known list of proper nouns, part numbers, and/or any other collection of values for a particular type of information. Further, the automated process may be implemented using an associative memory application and/or a regular expression processing programming, as described below. Moreover, the automated process may also utilize ontology-based methods to identify such collections of values. In these cases, as well as other cases not described here, applicable tags could be applied to the resultant terms of interest 204 uncovered during the automated process to add structure to such text.

In FIG. 2C, tags 206 are inserted to proceed the identified terms of interest, 204 thereby structuring the text. For example, a date-tag might be especially important to include while an exclude-tag might be unimportant. As such, the existence of such tags 206 is indicative of at least partially structured text 207. For example, in structured text 207, "Henry David Thoreau" is tagged using an "author" tag 208, "1862" is tagged using a "year" tag 210, and "Concord" is tagged using a "city" tag 212. In the example shown in FIG. 2C, tags 206 also include a "part_number" tag 214 and a "book_title" tag 216. As explained above, tags 206 may be inserted into unstructured text and/or partially structured text 202 by a data analyst or by using an automated process. The insertion of such tags generates structure for the text.

As shown in FIG. 2D, each type of tag 206 may also include a unique identification tag, or "i-tag". Tags and "i-tags" can vary in form and use different formats, including the use of HTML/XML style tags or a completely different format. In FIG. 2D, i-tags are shown in bold font and have the form "[ixx]". Several of the individual i-tags in FIG. 2D are individually referenced in the following paragraphs. The i-tags enable a user, such as the customer and/or the data analyst, to determine how well each tag 206 has been applied to the terms of interest 204. More specifically, the i-tags enable a user to quickly determine whether a given tag 206 was successfully applied and tagged a term of interest 204 as expected, whether one tag's 206 application conflicts with another's application, and/or whether one tag's 206 application is similar to and/or a duplicate of the application of another tag 206. To facilitate determining the proper application of tags 206, the resulting structured text 207 is displayed on a user interface that is coupled to one or more components of a text processing system.

For example, in FIG. 2D, author tag 208 includes i-tag "[i01]", and book_title tag 216 includes i-tag "[i02]". Both author tag 208 and book_title tag 216 correctly tagged terms of interest 204. However, as shown in FIG. 2D, an incorrect tag 220 misidentified "1234-1" in unstructured text and/or partially structured text 202. That is, part_number tag 214, which includes i-tag "[i05]", incorrectly identified "1234-1" as a part number in the phrase "The distance from his porch to the water's edge was 1234-1255 feet." That is, "1234-1", as used in that phrase, was not a term of interest 204, and should not have been tagged were part_number tag 214 applied properly. Additionally, i-tag "[i14]" also appears next to "1234-1", indicating that another tag 206 was applied to that particular text. By viewing the incorrect i-tags on a user interface, the data analyst can quickly determine that at least one of tags 206 including i-tags "[i05]" and "[i14]" operated improperly and/or unsuccessfully, and take appropriate steps to correct the error.

Once structured text 207 (which may be only partially structured) including tags 206 is verified (i.e., it is determined that all tags 206 operated properly), structured text 207 is released for further processing. In one embodiment, a user verifies the resultant structured text in an application data source to determine whether a text processing tool processed the unstructured and/or partially structured text from the main data source properly. If the user verifies the text was processed correctly, the user releases the text (structured and/or partially structured text) to an application data source such that a main application, as further described herein, can incorporate the structured text. If the user determines the text was processed incorrectly, the user updates processing tool data source and/or text processing tool to correct any text processing errors and/or mistakes. In embodiments, the verification and updating is automated or partially automated.

FIG. 3 is a flow diagram 300 of an exemplary methodology for the tagging of unstructured text to generate structured (or partially structured) text. It should be noted that the same methodology is utilized in the further tagging of partially structured text to further structure the text and the tagging of unstructured text that might result in only partially structured text, depending upon the content of the received text and the terms of interest. To further clarify, as used herein, unstructured text refers to text, typically entered by a person, that is free-form and variable based upon the syntax/language of the person. For example, email and notes fields will typically enable a user to enter a free-form response. Further, as used herein, text is referred to as structured and/or partially-structured if information in the text is tagged or otherwise called out in an organized way. In the exemplary embodiment, structured text refers to text including one or more tags that identify information in the text. For processing, unstructured text and/or partially structured text is supplied to a text processing tool 304.

In the exemplary embodiments described herein, text processing tool 304 includes one or both of a regular expression processing program 309 and an associative memory application 306 within an associative memory engine 308 for use in the structuring of unstructured text and/or partially structured text 302 through the insertion of tags, as described in detail herein. Associative memory application 306 includes an associative memory. As used herein, an associative memory refers to an information store generated using one or more data sources. The information store includes entities and attributes that are related to and/or associated with other entities and attributes. An entity is an instance in the associative memory of a particular item of interest, and an attribute is a property and/or description of an associated entity. The associative memory application 306 enables a user to do a similarity analysis and perform analogy queries through both the attributes and associates of entities and/or entity types. Accordingly, the associative memory application 306 enables the discovery of previously unidentified correlations between attributes and entities. Associative memory engine 308 enables associative memory application 306 to search for information about entities and entity relationships stored in the associative memory.

In the exemplary embodiment, text processing tool 304 also includes a regular expression processing program 309 for processing unstructured text and/or partially structured text 302, as described in detail below. Alternatively, text processing tool 304 may include only one of associative memory application 306 and regular expression processing program 309. Further, in some embodiments, associative memory application 306 or regular expression processing program 309 constitute the complete text processing tool 304. Text processing tool 304 utilizes associative memory application 306 and/or regular expression processing program 309 to process unstructured text and/or partially structured text 302 and output structured text 310, as described herein.

FIG. 4 is a diagram which illustrates the tagging (structuring) of unstructured text and/or partially structured text using a regular expression processing program (REPP) 400, such as regular expression processing program 309 (shown in FIG. 3). REPP 400 may be used with a system as further described herein. Depending on the application, REPP 400 may be one component of a text processing tool or may constitute the complete text processing tool. Unstructured text and/or partially structured text to be processed is stored in a source table 402 which may be part of a main data source. Unstructured text and/or partially structured text are organized in source table 402 as columns of text.

In the exemplary embodiment, to add tags to unstructured text and/or partially structured text, a user selects a desired segment of text using a user interface, for example, a user interface coupled to one or more components of a text processing system. Certain embodiments also allow for a user to simply hand-edit source to add tags. The selected segment of text is transmitted from source table 402 to REPP 400 for processing that adds tags, and therefore structure, to the text. Alternatively, segments and/or columns of unstructured text and/or partially structured text may be transmitted from source table 402 to REPP 400 automatically (i.e., without a user selecting text). REPP 400 may be programmed by executable instructions embodied in a computer-readable medium.

At REPP 400, one or more source regular expression patterns (SREPs) 404 are applied to the selected segment and/or column of text. In the exemplary embodiment, SREPs 404 are stored in a processing tool data source. The regular expressions in SREPs 404 are standard alphanumeric and non-alphanumeric characters available in most programming languages (e.g. Java, PERL) used to match a sequence of characters in text. In the exemplary embodiment, a given SREP 404 contains lines including four types of entries: a regular expression pattern that captures a desired sequence of characters, a replacement pattern, special characters that REPP 400 uses to perform particular actions (e.g. recursively apply a specific pattern), and a notes field to document the intended task of the given SREP 404. REPP 400 reads in SREP 404, applies each SREP 404 line in sequence from top to bottom, and outputs at least one of an output table 406 and an output HTML page 408. In some embodiments, output table 406 is part of an application data source as further described herein. In the exemplary embodiment, both output table 406 and output HTML Page 408 have data columns which contain the tagged text as shown in the "MODIFIED" column of output HTML page 408, the tagged text being referred to herein as structured text.

As noted above, the SREPs 404 match and tag predetermined patterns in the selected text to provide structuring for such text. For example, in FIG. 4, an Animal SREP matches and tags animal names in a text segment, and a Date SREP matches and tags four-character dates in a text segment as a year. The animal SREP and date SREP are specific examples of SREPS that may be applied in an embodiment. It should be noted that the animal SREP and date SREP do not necessarily correlate to the generic SREP examples (e.g., pattern1, pattern2) shown in 404. The tagged segment of text is then transmitted to output table 406 and/or output HTML page 408. In the exemplary embodiment, the user, utilizing a user interface, selects whether the tagged segment of text is transmitted to output table 406 and/or output HTML page 408. Further, in one embodiment, the structured segments of text are transmitted to an application for further processing. In one example described below, an application incorporates the structured text (i.e., the tagged segments of text) based at least in part on the tags that were placed into the text. For example, the application may include or exclude certain tagged words and/or phrases.

Output HTML page 408 displays the results of applying SREPs 404 to segments of unstructured text and/or partially structured text. For example, in FIG. 4, output HTML page 408 shows that "fox" was tagged as an animal in a first segment of text 410, and that "1492" was tagged as a year in a second segment of text 412. In one embodiment, output HTML page 408 is displayed on a display device of a user interface. By viewing output HTML page 408, the user can determine whether any segment of the structured text was improperly tagged. Using the user interface, in some embodiments, this misidentified text can be used to update SREP 404, for example, SREP 404 would be updated to correct one or more existing patterns that generated the improper tagging. For example, when the user identifies and/or selects the misidentified text, the misidentified text can be used to modify existing SREPs 404 and/or create new SREPs 404 to be applied to new unstructured text and/or partially structured text.

In the exemplary embodiment, each SREP 404 includes a unique identification tag, or "i-tag". The i-tags enable a user to determine how well each SREP 404 works during operation of REPP 400. More specifically, the i-tags enable a user to determine whether a given SREP 404 successfully matched and tagged a segment of text as expected, whether one SREP 404 conflicted with operation of another SREP 404, and/or whether one SREP 404 performed an operation that is similar to and/or a duplicate of operation of another SREP 404.

For example, in FIG. 4, the Animal SREP includes i-tag "[i21]" and the Date SREP includes an i-tag "[i22]". Accordingly, in output HTML page 408, first segment of text 410 includes "[i21]" to indicate that first segment of text 410 was tagged using the Animal SREP, and second segment of text 412 includes "[i22]" to indicate that second segment of text 412 was tagged using the Date SREP. While in the illustrated embodiment two SREPs 404 are utilized to apply tags to the unstructured text and/or partially structured text, any number of SREPs 404 may be applied that enables REPP 400 to function as described herein.

Figure 5:
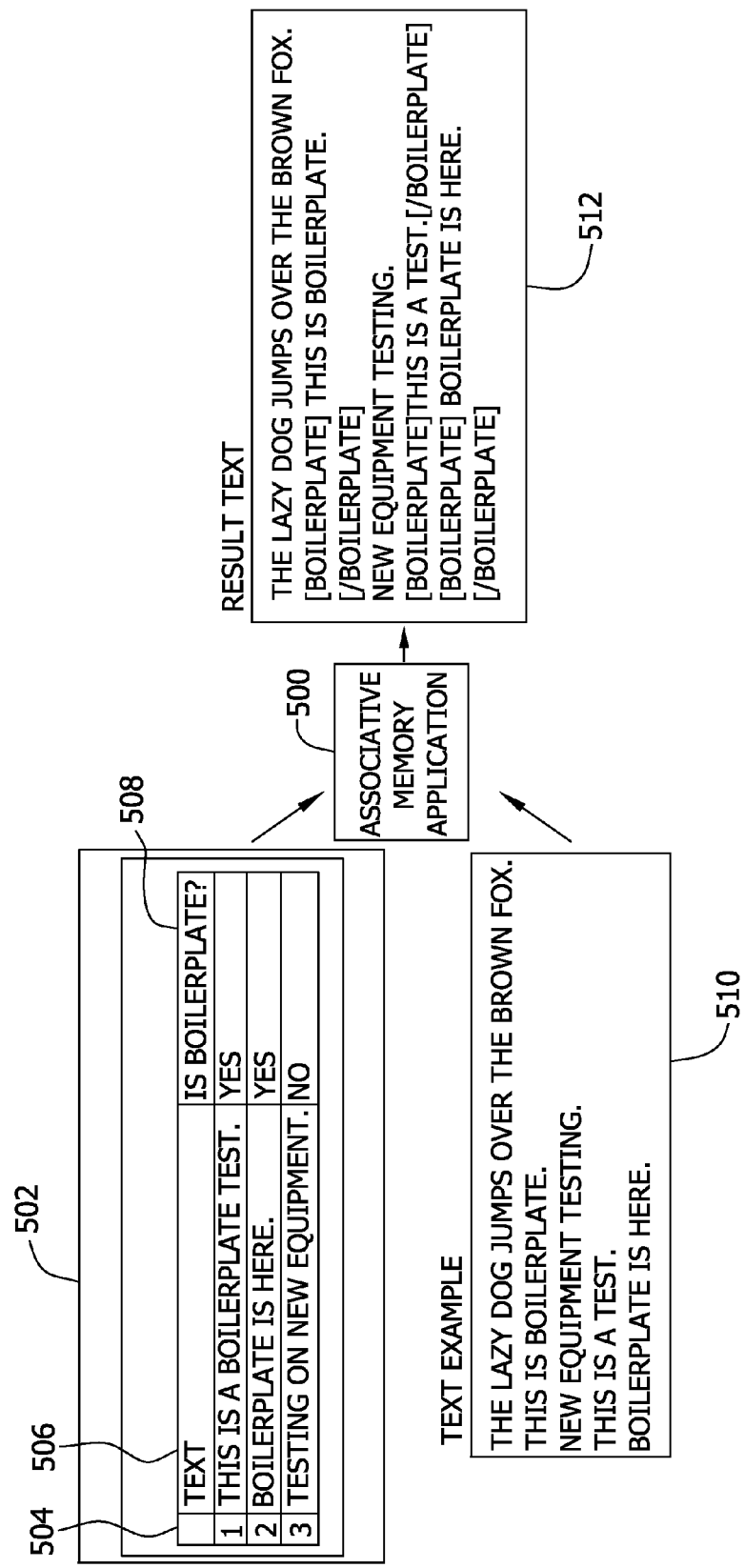
FIG. 5 is a diagram illustrating an exemplary method of tagging unstructured text using an associative memory application.

FIG. 5 is a diagram illustrating how an associative memory application 500, such as associative memory application 306, identifies and tags unstructured text to provide a structured text result. In the exemplary embodiment, unstructured text and/or partially structured text is stored in a data source in one or more columns. The unstructured text may be split amongst multiple columns, such that the unstructured text is broken up into multiple segments in separate columns. A text processing tool, such as text processing tool 304, utilizes the associative memory application 500 to identify and tag terms of interest in the unstructured and/or partially structured text, as described herein.

In the example shown in FIG. 5, the associative memory application 500 identifies and tags boilerplate text within unstructured/partially structured data, thereby adding structure to the unstructured/partially structured data. While the example shown in FIG. 5 illustrates identifying and tagging boilerplate, this example is merely illustrative, as the associative memory application 500 may be used to identify and tag any pertinent terms of interest in unstructured and/or partially structured text and/or data. In describing the example, it should be understood that "boilerplate data" is a general term describing categories of text and/or other data (e.g., alphanumeric data, embedded objects, images, metadata, etc.) that are often similar in style, format, and/or content, especially when the text/data is created by multiple sources. Boilerplate data includes, for purposes of this example, signature blocks, legal disclaimers, proprietary markings, and/or teleconferencing information, but the term should not be construed to be so limited. As boilerplate is generally irrelevant for particular applications, and may adversely impact results of using such applications if it is received by the main application, it is desirable to exclude (i.e., not incorporate) boilerplate from such applications. In this particular example, if a segment of text is similar to existing boilerplate, it is tagged as boilerplate. This example is provided to demonstrate how a text processing tool utilizes an associative memory application to identify and tag text in one embodiment, and in no way limits the scope of the methods and systems described herein. More specifically, the associative memory application may be utilized to identify textual terms of interest that are unrelated to identification and tagging of boilerplate text if the associative memory application is so configured.

To identify and tag text, a text processing tool, such as text processing tool 304, queries an associative memory application 500, such as associative memory application 306 (as shown in FIG. 3). In the exemplary embodiment, the associative memory application 500 is generated from a database. For example, FIG. 5 shows a database 502 including a label column 504 that includes a unique integer for different strings of text, a text column 506 that includes the different strings of text, and an identification column 508 that identifies whether or not the string of text is a term of interest. For example, in database 502, the text "BOILERPLATE IS HERE." is identified as boilerplate, while the text "TESTING ON NEW EQUIPMENT." is identified as not being boilerplate. Although in the exemplary embodiment, database 502 has three columns, database 502 may have any number of columns that enables the test processing tool and the associative memory application to function as described herein. In some embodiments, database 502 is considered a parallel to the regular expression patterns, such as SREPs 404 (shown in FIG. 4).

In the exemplary embodiment, to generate the associative memory application 500, label column 504 and identification column 508 are incorporated directly into the associative memory application 500. In the exemplary embodiment, segments of text in text column 506 are incorporated directly into the associative memory application 500, such that text column 506 and the associated text segments form part of the associative memory application 500. Alternatively, segments of text in text column 506 may be incorporated into the associative memory application 500 using generic word parsers and/or extractors, such that the text in text column 506 may be further broken down and/or parsed into key terms, such as keywords and/or key phrases that form one or more segments of text in the associative memory application 500. For example, text column 506 may be broken down and/or parsed into nouns, verbs, and/or adjectives. Alternatively, the associative memory application 500 may be implemented using any process that enables the text processing tool to function as described herein. When using the associative memory application 500, the unstructured and/or partially structured text is broken and/or parsed into segments, and is compared against the component and/or keyword breakdown of segments of text in the text column 506 of the associative memory application 500, as described in detail below.

In the exemplary embodiment, the text processing tool receives unstructured and/or partially structured text, such as sample text 510, from a data source. In the exemplary embodiment, sample text 510 is generated by parsing the unstructured and/or partially structured text into discrete segments of text using generic word parsers and/or extractors. By querying the associative memory application 500 using sample text 510, the text processing tool identifies and tags segments of sample text 510 as terms of interest, generating result text 512. For example, the text "BOILERPLATE IS HERE." is tagged as boilerplate, and the text "NEW EQUIPMENT TESTING." is not tagged as boilerplate in result text 512. In an alternative embodiment, the text "NEW EQUIPMENT TESTING." may be tagged as non-boilerplate. Because the text processing tool utilizes the contents of the text column 506 in an associative memory application to identify and tag text, segments of unstructured text and/or partially structured text need not exactly match segments of text in the associative memory application. For example, "THIS IS BOILERPLATE." is identified and tagged as boilerplate, even though the associative memory application includes the textual phrase "THIS IS A BOILERPLATE TEST."

Figure 6:
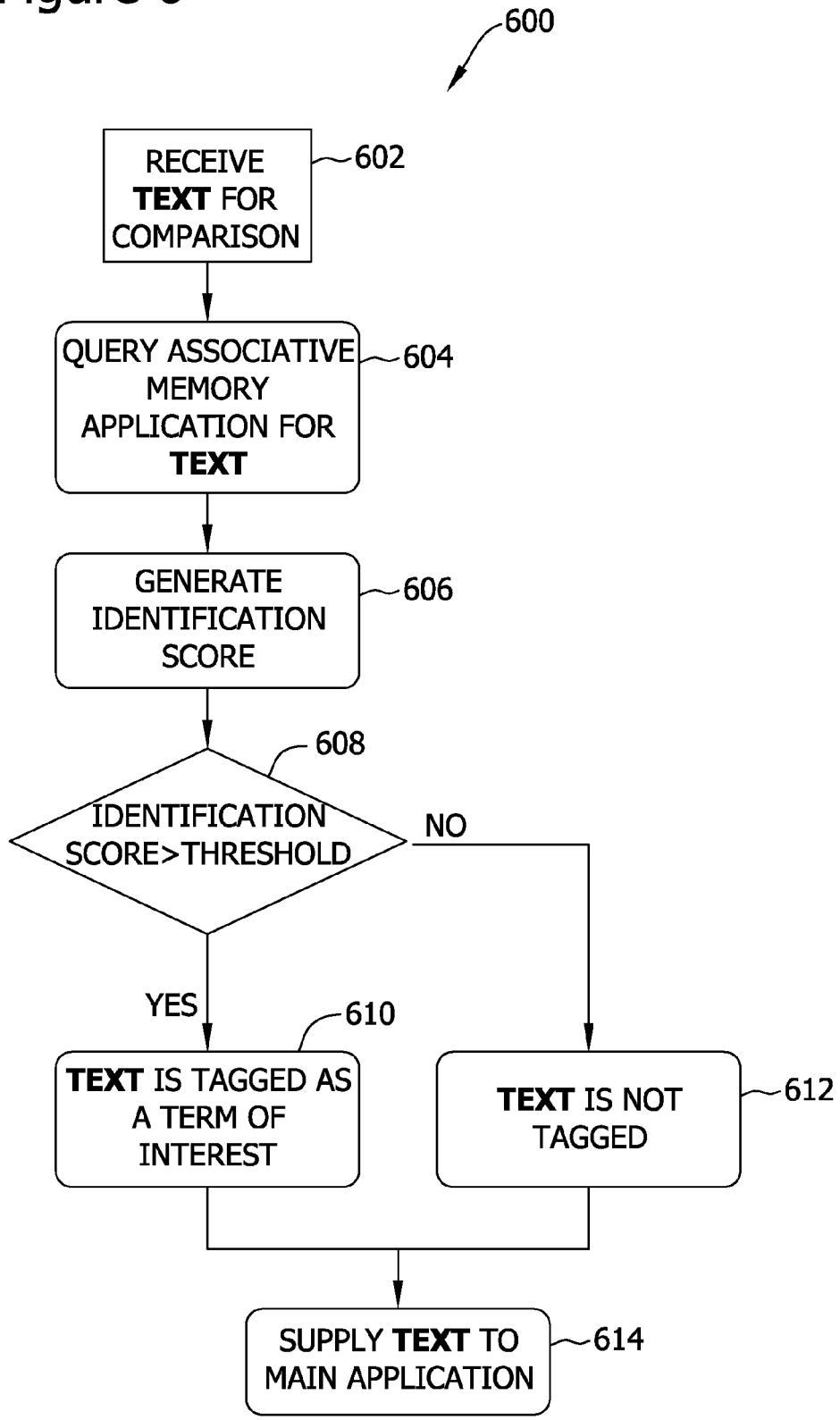
FIG. 6 is a flowchart of an exemplary method for identifying and tagging unstructured text using an associative memory application.

FIG. 6 is a flow chart of an exemplary method 600 for identifying and tagging text using an associative memory application, such as associative memory application 306. A text processing tool, such as text processing tool 304, receives 602 the unstructured and/or partially structured text to be processed. For identification purposes, the unstructured and/or partially structured text is broken down and/or parsed into discrete segments of text, such as paragraphs, sentences, and/or words. For each segment of unstructured and/or partially structured text, the text processing tool queries 604 the associative memory application and, based on the content breakdown and/or keywords of the segment of unstructured and/or partially structured text as compared to the content breakdown and/or keywords of the segments in text column(s) 506 in the associative memory application, the associative memory application generates 606 an identification score. The text processing tool determines 608 whether the identification score is above a predetermined threshold. If the identification score is above the predetermined threshold, the segment of unstructured and/or partially structured text is tagged 610 as a term of interest. If the identification score is below the predetermined threshold, the segment of unstructured and/or partially structured text is not tagged 612. The segment of text, which, depending on the identification score, may be tagged, is then supplied 614 to a main application for incorporation based on the tagging. The tagged text is structured text. In one embodiment, the structured text is sent to an output table, which is then used by the main application. In the exemplary embodiment, the text processing tool utilizes the associative memory application to identify and tag the remaining segments of unstructured and/or partially structured text accordingly.

Figure 7:
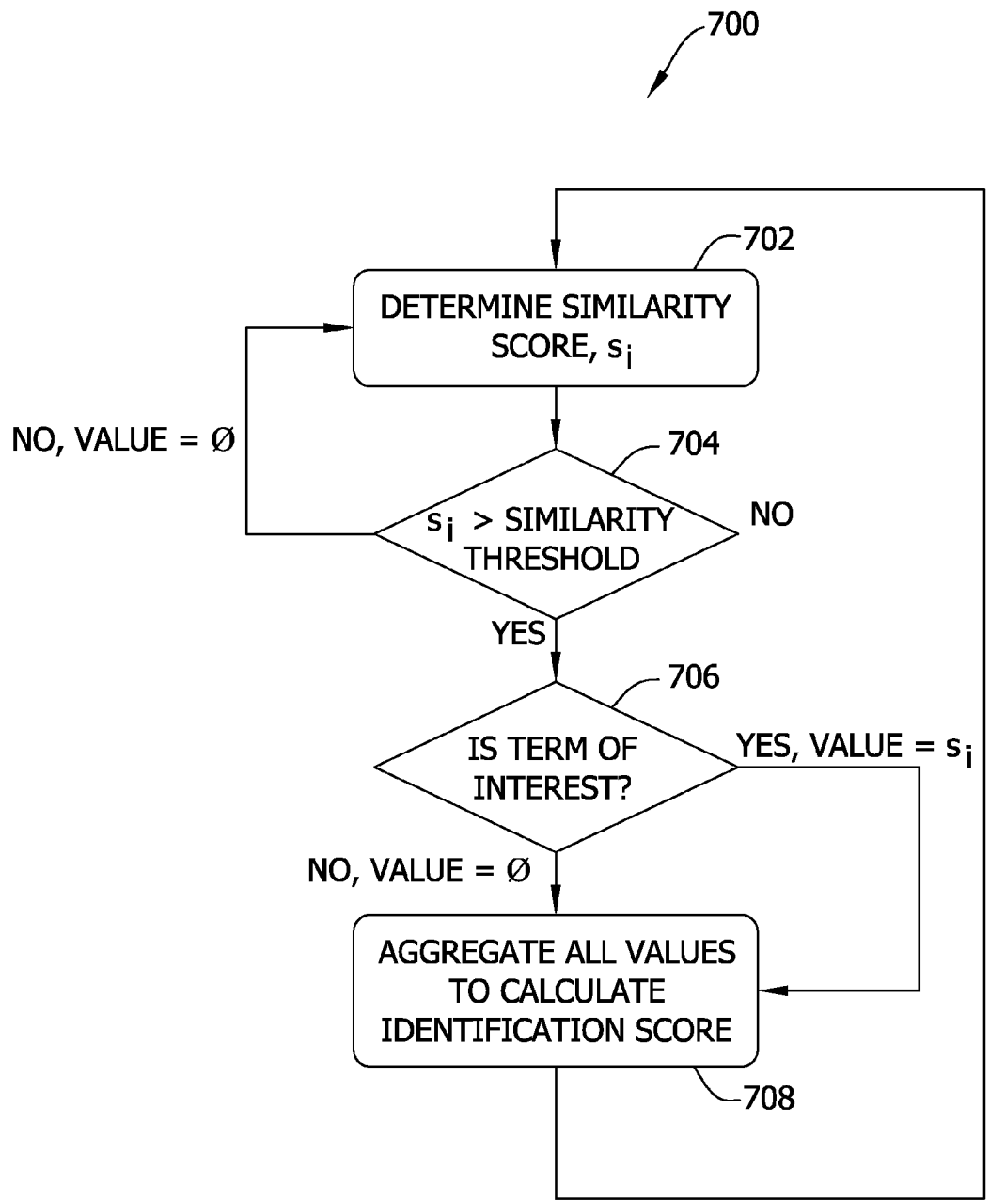
FIG. 7 is a flowchart of an exemplary method for generating an identification score.

FIG. 7 is a flow chart of exemplary method 700 for generating an identification score for a segment of unstructured and/or partially structured text to which the associative memory application is applied. For each segment of text in the associative memory application (i.e., each string of text from text column 506), the text processing tool determines 702 a similarity score, for the segment of unstructured and/or partially structured text as compared to the segment of text (text column 506) in the associative memory application. For example, the similarity score $s_i$ may be defined as the number of matching terms (e.g., words) between the segment of unstructured and/or partially structured text and the segment of text in the associative memory application, divided by the total number of terms in the segment of unstructured and/or partially structured text. The text processing tool determines 704 whether the similarity score $s_i$ is above a predetermined similarity threshold. If the similarity score is below the predetermined similarity threshold, the text processing tool assigns the segment of text in the associative memory application a value of "0" and begins determining 702 the similarity score $s_i$ for the same segment of unstructured and/or partially structured text as compared to the next segment of text in the associative memory application.

If the similarity score $s_i$ is above the predetermined similarity threshold, the text processing tool determines 706, for example, using the information from identification column 508 of database 502, whether the segment of text in the associative memory application is a term of interest. In the exemplary embodiment, if the segment of text in the associative memory application is a term of interest, the segment of text in the associative memory application is assigned a value equal to the similarity score. If the segment of text in the associative memory application is not a term of interest, the segment of text in the associative memory application is given a value of "0". After the value is determined for each of the segments of text in the associative memory application (i.e., for each string of text from column 506) with respect to particular segment of unstructured and/or partially structured text, the identification score for the segment of unstructured and/or partially structured text is calculated by aggregating 708 the values assigned to each of the segments of text in the associative memory application.

While FIG. 7 shows an exemplary method 700 for generating an identification score, any method that enables the text processing tool to function as described herein may be utilized. For example, in some embodiments, a segment of text in the associative memory application is assigned a non-zero value when the similarity score $s_i$ is below the predetermined threshold and/or when the segment of text in the associative memory application is not a term of interest. Further, in other embodiments, the similarity scores and values may be utilized to calculate the identification score using other, more complex measures.

Figure 8B:
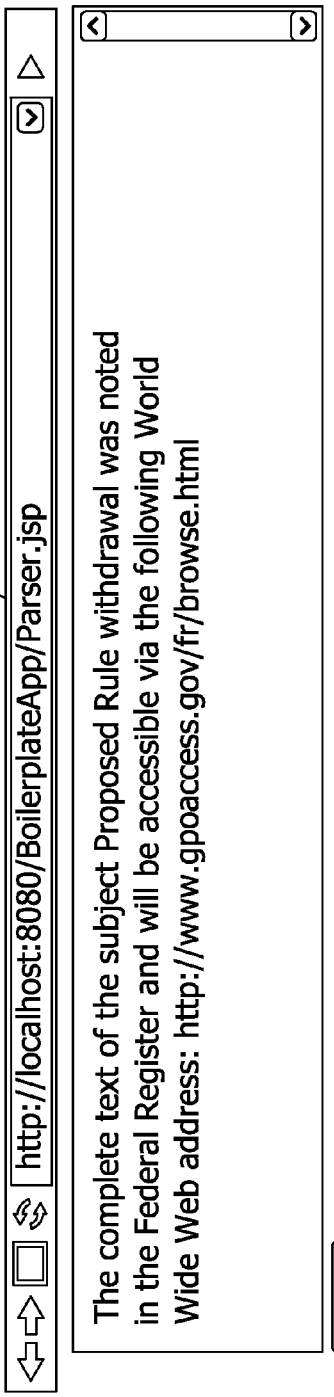
Figure 8C:
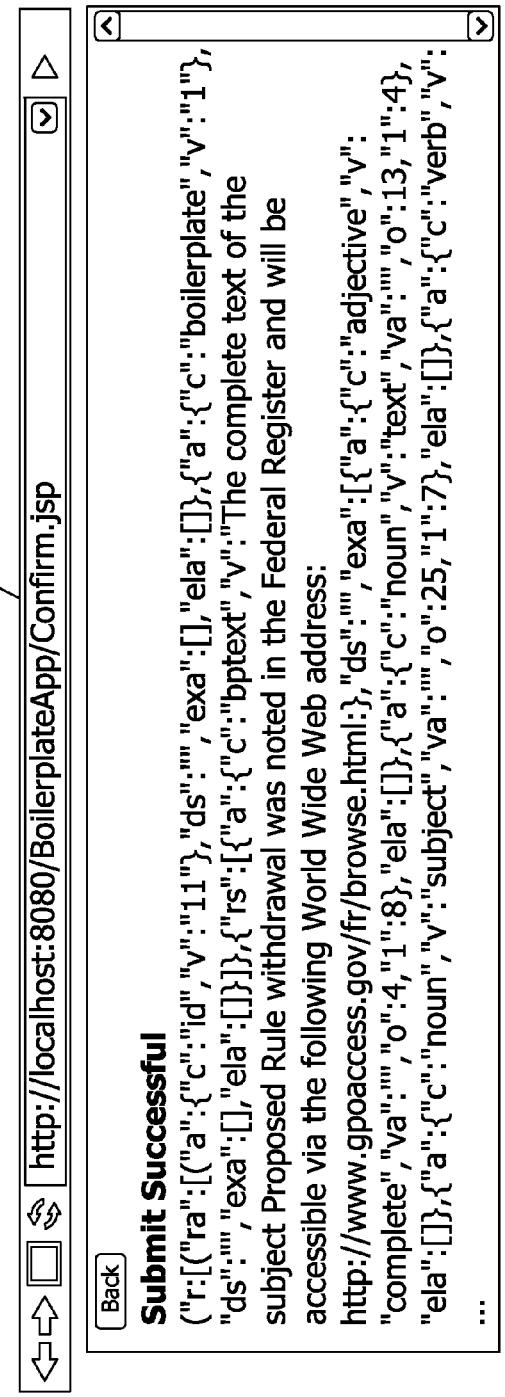

FIGS. 8A-8C are screenshots of an exemplary user interface that enables a user to add misidentified text to the associative memory application described above. In the exemplary embodiment, the user interface displays the structured text after it has been processed by text processing tool. For example, for the associative memory application example discussed above, the user interface displays the text associated with an E-mail 802. The text includes a first boilerplate section 804 and a second boilerplate section 806. As shown in FIG. 8A, a text processing tool identified and tagged second boilerplate section 806 as being boilerplate text, but failed to identify and tag first boilerplate section 804 as boilerplate text. Accordingly, first boilerplate section 804 is misidentified text.

Utilizing the user interface, the user can visually identify the misidentified text. Further, the user can copy the misidentified text into a window 808, as shown in FIG. 8B. By selecting a parse button 810, the misidentified text is loaded into a processing tool data source. Once the misidentified text is supplied to the associative memory application in the text processing tool, a confirmation window 812 is displayed on the user interface, alerting the user that the associative memory application has been updated to include the misidentified text, as shown in FIG. 8C.

Accordingly, when a text processing tool processes unstructured text and/or partially structured text that contains misidentified text, and is so informed through, for example, a user interaction, the text processing tool will be updated to correctly process such misidentified text going forward. As such, the text processing tool is repeatedly updated, improving the ability of the text processing tool to process new unstructured text and/or partially structured text from a data source. Further, updating the text processing tool does not require complicated programming of the text processing tool and/or expert knowledge of associative memory systems and methods. Rather, a user can update the text processing tool relatively quickly and easily using a user interface.

Figure 9:
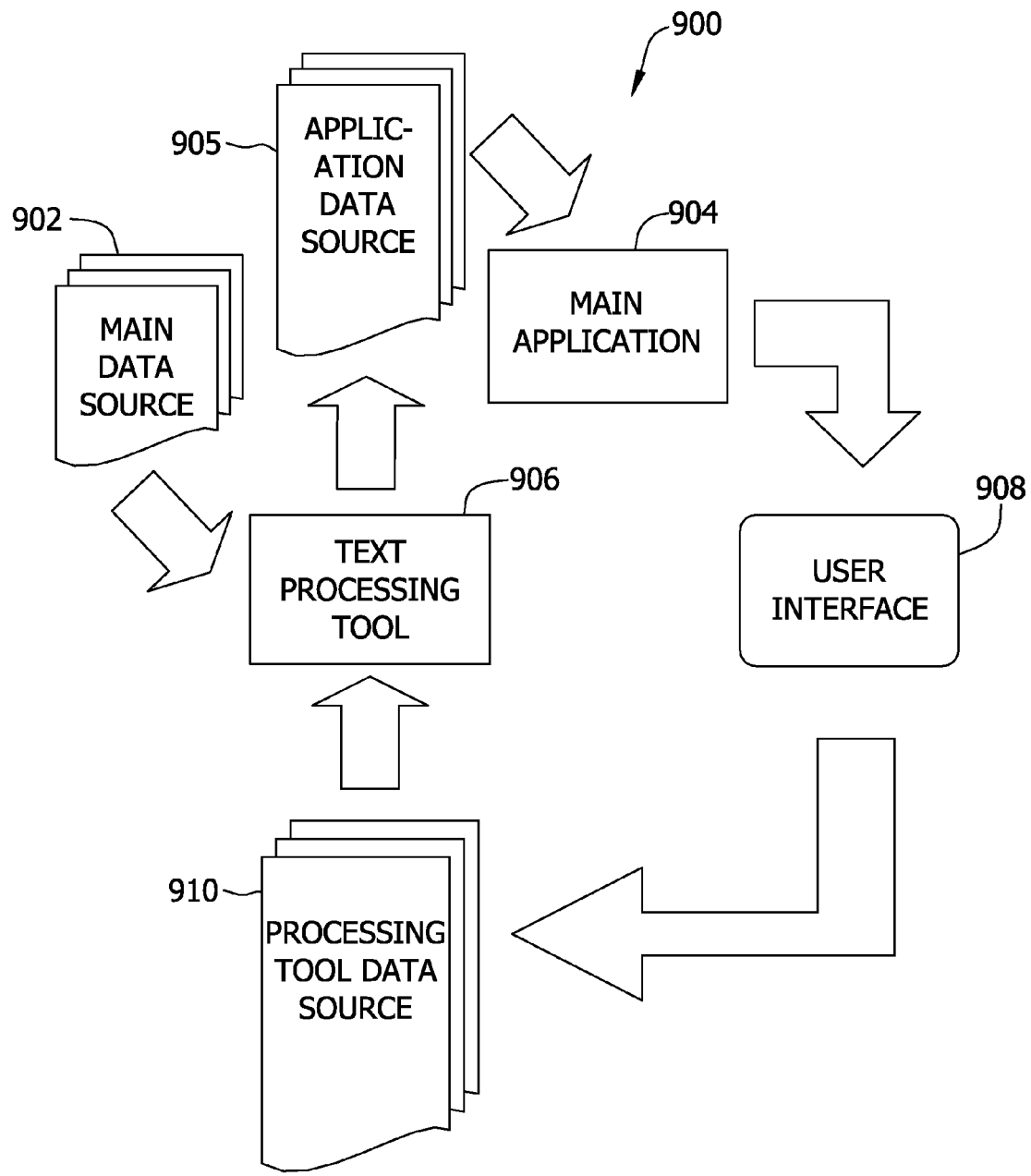
FIG. 9 is a block diagram of an exemplary text processing system.

FIG. 9 is a block diagram of an exemplary text processing system 900 that might incorporate some or all of the above described embodiments. System 900 includes a main data source 902 that receives and/or includes unstructured text and/or partially structured text (i.e., unprocessed text) to be eventually incorporated, for example, into a main application 904. As used herein, incorporating text into main application 904 refers to inputting correctly tagged (structured) text into main application 904. Main data source 902 may include any number of individual data sources that enables system 900 to function as described herein. In the exemplary embodiment, main application 904 incorporates text from an application data source 905.

Main data source 902 is coupled to a text processing tool 906, such as text processing tool 304 (shown in FIG. 3). In the exemplary embodiment, text processing tool 906 receives unstructured text and/or partially structured text from main data source 902 and processes the unstructured text and/or partially structured text into at least partially structured text though the addition of appropriate tags as described above. The structured text includes at least one segment of text that has been tagged. As used herein, a segment of text refers to one or more words of text, where a word may be any set of contiguous characters. Text processing tool 906 includes one or both of the associative memory application, such as associative memory application 306 (shown in FIG. 3), and/or a regular expression processing program, such as regular expression processing program 309 (shown in FIG. 3), for processing unstructured text and/or partially structured text, as described in detail above.

Text processing tool 906 is coupled to main application 904 through application data source 905 such that unstructured text and/or partially structured text from main data source 902 is processed by text processing tool 906 and output as structured text to application data source 905 for utilization in main application 904. Alternatively, structured text output from text processing tool 906 may undergo additional processing before being transmitted to application data source 905. Application data source 905 may include for example, an output table and/or an output hypertext markup language (HTML) page that is used to verify the structuring of text, though other formats are contemplated. In the exemplary embodiment, main application 904 incorporates the structured text from application data source 905.

To process unstructured text and/or partially structured text from main data source 902, text processing tool 906 queries an associative memory application and/or applies at least one source regular expression pattern to the unstructured text and/or partially structured text. For example, in one embodiment, text processing tool 906 processes the unstructured text and/or partially structured text by querying the associative memory application with a segment of unstructured text and/or partially structured text, calculating a similarity score, and determining whether to tag the segment of unstructured text and/or partially structured text based on the similarity score.

The structured text generated from processing the unstructured text and/or partially structured text with text processing tool 906 is transmitted from text processing tool 906 to application data source 905, where it can be incorporated into main application 904. Main application 904 incorporates the structured text based on the tagged segments of text. For example, in some embodiments, tagged text is incorporated into main application 904, and untagged text is not incorporated into main application 904. To clarify, in the example presented herein, text tagged with boilerplate tags is ignored and everything else is incorporated by the main application.

In the exemplary embodiment, main application 904 is a data analysis application, and may include, for example, a business intelligence application, an associative memory application, and/or a search engine. Alternatively, main application 904 may be any application that enables system 900 to function as described herein. In the exemplary embodiment, text processing tool 906 processes unstructured text and/or partially structured text before the structured text is incorporated by main application 904. Main application 904 incorporates the structured text based on the tagging of the unstructured text and/or partially structured text by text processing tool 906. Processing text for incorporation by main application 904 reduces the total amount of text incorporated into main application 904, improves the speed of incorporating text into main application 904, reduces the amount of memory used by main application 904, and/or improves the speed at which text can be retrieved from main application 904, and improves the results.

In the exemplary, embodiment, main application 904 is coupled to a user interface 908. User interface 908 may include a display device, such as a cathode ray tube (CRT), a liquid crystal display (LCD), an organic LED (OLED) display, and/or an "electronic ink" display. Further, user interface 908 may include an input device that enables a user to interact with user interface 908, such as a keyboard, a pointing device, a mouse, a stylus, a touch sensitive panel (e.g., a touch pad or a touch screen), a gyroscope, an accelerometer, a position detector, and/or an audio user input interface. Utilizing user interface 908, a user can view the structured text. User interface 908 enables the user to select and extract misidentified text from the structured text. That is, the user can select and extract segments of text that were processed incorrectly or not at all by text processing tool 906. In the exemplary embodiment, data relating to the misidentified text and/or the misidentified text itself is then forwarded to and/or stored on a processing tool data source 910 coupled to user interface 908. In some embodiments, processing tool data source 910 also includes initial data to be supplied to text processing tool 906 that is not misidentified text. Text processing tool 906 utilizes the initial data as well as updates originating from user input received at user interface 908 to process unstructured and/or partially structured text in accordance with the methods and systems described herein. In some embodiments, one or more additional user interfaces are coupled to one or more components of text processing system 900 to facilitate enabling the methods and systems described herein. As shown in FIG. 9, text processing, application of the processed text to the main application 904, review via a user interface 908 for additional text processing needs can be an iterative and repeated process capable of providing improved results as tagging of text is improved.

In embodiments where text processing tool 906 includes an associative memory application, processing tool data source 910 updates the associative memory application, for example, based on user inputs, as is described above. Further, in embodiments where text processing tool 906 includes a regular expression processing program, source regular expressions patterns can be updated to properly process the unstructured text and/or partially structured text that includes the previously misidentified text. Similar to main data source 902, processing tool data source 910 may include any number of individual data sources that enables system 900 to function as described herein. In one embodiment, processing tool data source 910 supplies any misidentified text to the associative memory application of text processing tool 906 on a periodic basis based on inputs received via user interface 908. Alternatively, processing tool data source 910 may supply the misidentified text to text processing tool 906 continuously or whenever a user identifies new segments of misidentified text.

Text processing tool 906 is updated with the misidentified text from processing tool data source 910 to improve future processing of unstructured text and/or partially structured text from main data source 902. Accordingly, by supplying text that is initially misidentified by text processing tool 906 back into text processing tool 906, the ability of text processing tool 906 to correctly process unstructured text and/or partially structured text improves over time, as text processing tool 906 utilizes the misidentified text when processing new unstructured text and/or partially structured text. While only one text processing tool 906 is illustrated in the exemplary embodiment, system 900 may include any number of text processing tools 906 that enable system 900 to perform as described herein. For example, system 900 may include different text processing tools 906 for processing different types of unstructured text and/or partially structured text from different main data sources 902 and/or text processing tools 906 that utilize different text processing methods.

As described above, in the exemplary embodiment, text processing tool 906 supplies the structured text to application data source 905 which provides data to main application 904. Further, the structured text may be included in an output table and/or an output HTML page in application data source 905. In the examples explained herein, main application 904 processes, for example, text based on whether the text is tagged as described using one or both of the regular expression processing program and the associative memory application. For instance, in one specific example, main application 904 does not incorporate text that has been tagged as boilerplate. Alternatively, main application 904 may incorporate structured text from application data source 905 in any manner than enables system 900 to function as described herein.

System 900 operates by setting up an architecture enabling users (without any specialized skills) of a data analysis system 904 to improve the performance of the system 904 by building up data sources 910 for a data processing tool 906. Applying the parsing capability of data processing tool 906, in one embodiment, includes applying an associative memory data markup process that includes starting with data for comparison, parsing the data to determine associative memory entities and attributes, querying the associative memory application for similar results based upon the entities and attributes derived from the data, utilizing similar result sets to rank and score results, and based on the score, implying additional information about the entities and attributes. The additional information transforms the generic entities and attributes and into more domain-specific entities and attributes. Using the domain-specific entities and attributes, the data can be marked up for later use improved data analysis system 904 (e.g. an associative memory system, a business intelligence application, a search engine, etc.). Further, the output from these analysis systems can be examined to identify and extract misidentified data that can feed the data source 910 of the "data processing" associative memory application 906 through a user interface 908.

Figure 10:
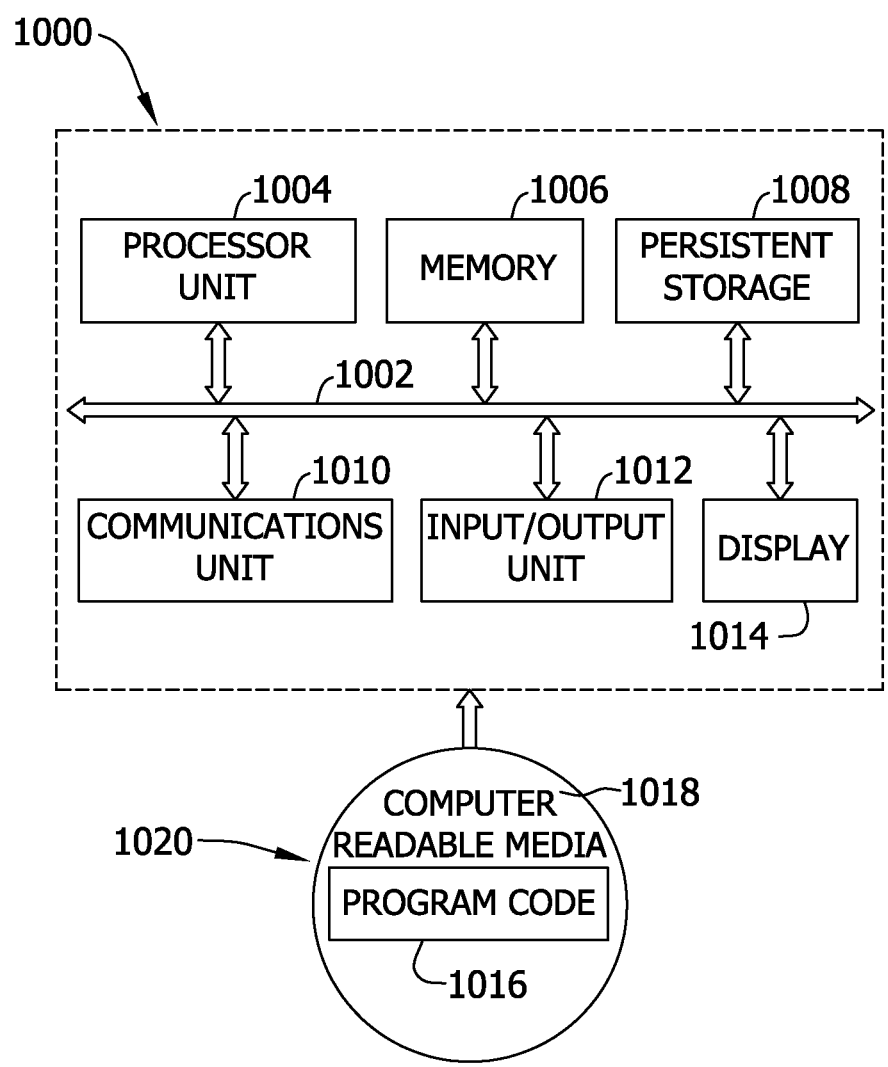
FIG. 10 is a diagram of a data processing system.

FIG. 10 is a diagram of an exemplary data processing system 1000 that may be used in implementing one or more of the embodiments described herein. For example, text processing tool 304 (906), associative memory application 306, regular expression processing program 309, and/or one or more components of text processing system 900 may be implemented using data processing system 1000. In the exemplary embodiment, data processing system 1000 includes communications fabric 1002, which provides communications between processor unit 1004, memory 1006, persistent storage 1008, communications unit 1010, input/output (I/O) unit 1012, and display 1014.

Processor unit 1004 serves to execute instructions for software that may be loaded into memory 1006. Processor unit 1004 may be a set of one or more processors or may be a multi-processor core, depending on the particular implementation. Further, processor unit 1004 may be implemented using one or more heterogeneous processor systems in which a main processor is present with secondary processors on a single chip. As another illustrative example, processor unit 1004 may be a symmetric multi-processor system containing multiple processors of the same type. Further, processor unit 1004 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

Memory 1006 and persistent storage 1008 are examples of storage devices. A storage device is any piece of hardware that is capable of storing information either on a temporary basis and/or a permanent basis. Memory 1006, in these examples, may be, for example, without limitation, a random access memory or any other suitable volatile or non-volatile storage device. Persistent storage 1008 may take various forms depending on the particular implementation. For example, without limitation, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, without limitation, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either or both physical and wireless communication links.

Input/output unit 1012 allows for input and output of data with other devices that may be connected to data processing system 1000. For example, without limitation, input/output unit 1012 may provide a connection for user input through a keyboard and mouse. Further, input/output unit 1012 may send output to a printer. Display 1014 provides a mechanism to display information to a user.

Instructions for the operating system and applications or programs are located on persistent storage 1008. These instructions may be loaded into memory 1006 for execution by processor unit 1004. The processes of the different embodiments may be performed by processor unit 1004 using computer implemented instructions, which may be located in a memory, such as memory 1006. These instructions are referred to as program code, computer usable program code, or computer readable program code that may be read and executed by a processor in processor unit 1004. The program code in the different embodiments may be embodied on different physical or tangible computer readable media, such as memory 1006 or persistent storage 1008.

Program code 1016 is located in a functional form on computer readable media 1018 that is selectively removable and may be loaded onto or transferred to data processing system 1000 for execution by processor unit 1004. Program code 1016 and computer readable media 1018 form computer program product 1020 in these examples. In one example, computer readable media 1018 may be in a tangible form, such as, for example, an optical or magnetic disc that is inserted or placed into a drive or other device that is part of persistent storage 1008 for transfer onto a storage device, such as a hard drive that is part of persistent storage 1008. In a tangible form, computer readable media 1018 also may take the form of a persistent storage, such as a hard drive, a thumb drive, or a flash memory that is connected to data processing system 1000. The tangible form of computer readable media 1018 is also referred to as computer recordable storage media. In some instances, computer readable media 1018 may not be removable.

Alternatively, program code 1016 may be transferred to data processing system 1000 from computer readable media 1018 through a communications link to communications unit 1010 and/or through a connection to input/output unit 1012. The communications link and/or the connection may be physical or wireless in the illustrative examples. The computer readable media also may take the form of non-tangible media, such as communications links or wireless transmissions containing the program code.

In some illustrative embodiments, program code 1016 may be downloaded over a network to persistent storage 1008 from another device or data processing system for use within data processing system 1000. For instance, program code stored in a computer readable storage medium in a server data processing system may be downloaded over a network from the server to data processing system 1000. The data processing system providing program code 1016 may be a server computer, a client computer, or some other device capable of storing and transmitting program code 1016.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown.

As one example, a storage device in data processing system 1000 is any hardware apparatus that may store data. Memory 1006, persistent storage 1008 and computer readable media 1018 are examples of storage devices in a tangible form.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 1006 or a cache such as that found in an interface and memory controller hub that may be present in communications fabric 1002.

The embodiments described herein use a data processing tool to provide improved processing of unstructured and/or partially structured data, providing improved efficiency and performance over existing data processing methods. The data may be processed using an associative memory application and/or a regular expression processing program. Further, after the unstructured and/or partially structured data is processed, users can identify data that has been misidentified and/or unidentified (e.g., text that is ignored or inappropriately tagged) by the data processing tool. This misidentified data is used to improve and refine the ability of the data processing tool to process and identify new unstructured and/or partially structured data. Further, in some embodiments, a user interface enables users to identify and select the misidentified data without requiring that users be experienced in sophisticated data processing methods and systems and/or associative memory systems. As at least some of the methods and systems described herein do not require dedicated personnel to maintain and/or update the data processing tool, the methods and systems described herein facilitate reducing costs associated with known data analysis systems.

The embodiments are directed, at least in part, to the identification of relationships and/or observed coincidences between two items within unstructured data. The described embodiments operate to set up the unstructured data so that the associative memory software can process it. Such pre-processing opens up further processing opportunities, for example, the technology may be applied to metadata in images, metadata standards, and the examination of metadata in websites. In conclusion, the embodiments identify and tag relevant segments of data within unstructured data to build an improved data analysis system, for example, an associative memory system, a business intelligence application, a search engine, and/or an image associative memory system.

Advantageously, the methods and systems described herein allow data processing tools to be built by users with specific data from a main application itself. For instance, a data processing tool is generated using the above embodiments based upon "actual data" (example cases), which may improve a data processing tool to be more robust, precise, or accurate than many conventional rule based systems. For example, many conventional rule based systems require an expert, for instance, a natural programming language expert, to capture one or more domain specific items, e.g., part numbers, serial numbers, and the like, and/or identify a pattern of interest and generate rules/codes to properly identify the information. Furthermore, using the embodiments of this invention, system users may identify example cases and use the identified examples to flow back information, e.g., data snippets, during a preprocessing stage of, for instance, the next periodic update for data processing and therefore build up the data processing system. As such, the embodiments of the present invention may work with only a sparse amount of initial data. Thus, this novel system avoids a requirement of a large amount of training data as compared to many conventional neural networks. Finally, users who are most familiar with the data, e.g., actual data, may identify terms of interest, for example, boilerplate, and enter its contents into the data processing tool; thus, updates to the data processing tool may be applied the next time a problem space containing unstructured and/or partially structured data is processed or incrementally as updated data is added to the system.

Processing data in accordance with the systems and methods described herein reduces the total amount of data, for example text, incorporated into a main application, improves the speed of data incorporation, reduces an amount of memory used to store data, and improves a speed at which data can be retrieved. Further, as at least some of the methods and systems described herein do not require dedicated personnel to maintain and/or update the data processing tool, the methods and systems described herein facilitate reducing costs associated with known data analysis systems.

The methods and systems described herein may be encoded as executable instructions embodied in a computer readable medium, including, without limitation, a storage device or a memory area of a computing device. Such instructions, when executed by one or more processors, cause the processor(s) to perform at least a portion of the methods described herein. As used herein, a "storage device" is a tangible article, such as a hard drive, a solid state memory device, and/or an optical disk that is operable to store data.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for processing data, the method comprising:
   receiving, at a data processing tool, at least one data file including at least partially unstructured data from at least one data source, wherein the at least partially unstructured data includes actual data from a main application;
   processing, by a processor, the at least partially unstructured data to generate at least partially structured data that includes tagged data, wherein the tagged data includes a tag inserted to precede at least one identified term of interest, and wherein processing the at least partially unstructured data comprises at least one of:
      processing the at least partially unstructured data using an associative memory application that tags the at least one term of interest based on a generated identification score exceeding a predetermined threshold where the score is determined based on the number of matching terms between a segment of unstructured text and a segment of text in the associative memory application; and
      processing the at least partially unstructured data using a regular expression processing program;
   transmitting the at least one data file including the at least partially structured data to the main application;
   incorporating the at least partially structured data into the main application based at least in part on the tagged data, wherein incorporating the at least partially structured data comprises at least one of including and excluding data based on at least one of existence, content and type of a tag;
   displaying, at a user interface, the at least partially structured data, wherein at least partially structured data includes at least one segment of misidentified data that is at least one of incorrectly tagged and incorrectly not tagged;
   receiving, at the user interface, a user selection of at least one segment of misidentified data;
   updating the misidentified data to form re-identified data;
   updating the associative memory application to include the re-identified data that includes data that has been correctly tagged or correctly not tagged;
   receiving, at the data processing tool, text segments generated by parsing the at least partially unstructured data into discrete text segments;
   identifying one or more of the text segments as boilerplate data based on a comparison between the text segments and strings of text in a column incorporated in an associative memory application, wherein the text segments need not exactly match the strings of text in the associative memory application; and
   incorporating data including text segments parsed from the at least partially structured data into the main application, wherein the text identified as boilerplate data is excluded from the data incorporated into the main application.

2. The method according to claim 1, further comprising:
   verifying at least partially structured data is tagged correctly; and
   releasing at least partially structured data, such that the at least partially structured data may be incorporated into the main application.

3. The method according to claim 2, wherein verifying at least partially structured data comprises examining one or more identification tags in the at least partially structured data.

4. The method according to claim 1, wherein processing at least partially unstructured data using an associative memory application comprises:
   parsing at least partially unstructured data into one or more segments of at least partially unstructured data;
   querying the associative memory application with at least one segment of the at least partially unstructured data;
   generating a score associated with the at least one segment of at least partially unstructured data and at least one segment of data in the associative memory application; and
   tagging the at least one segment of at least partially unstructured data based on the score.

5. The method according to claim 4, wherein querying the associative memory application comprises querying an associative memory application that includes at least one segment of data containing boilerplate, and wherein tagging at least one segment of at least partially unstructured data comprises tagging at least one segment of at least partially unstructured data that includes boilerplate.

6. The method according to claim 1, further comprising:
   updating the data processing tool based on the at least one segment of misidentified data.

7. The method according to claim 1, further comprising outputting at least partially structured data to one of an output table and an output hypertext markup language (HTML) page.

8. The method according to claim 1, wherein processing the at least partially unstructured data using a regular expression processing program comprises:
   applying at least one source regular expression pattern to at least partially unstructured data;
   matching at least one segment of the at least partially unstructured data to the at least one source regular expression pattern; and
   tagging at least one matched segment of the at least partially unstructured data.

9. The method according to claim 8, wherein tagging at least one matched segment of the at least partially unstructured data comprises tagging at least one matched segment of at least partially unstructured data with an identification tag.

10. The method according to claim 1, wherein updating the misidentified data comprises:
    placing the misidentified data back into the processing without correcting the misidentified data; and
    manually identifying the misidentified data to form the re-identified data.

11. One or more non-transitory computer-readable storage media having computer-executable instructions embodied thereon, wherein when executed by at least one processor, the computer-executable instructions cause the at least one processor to:

receive, at a data processing tool, at least one data file including at least partially unstructured data from at least one data source, wherein the at least partially unstructured data includes actual data from a main application;

process the at least partially unstructured data to generate at least partially structured data that includes tagged data, wherein the tagged data includes a tag inserted to precede at least one identified term of interest, and wherein to process the at least partially unstructured data, the computer-executable instructions cause the processor to:

process the at least partially unstructured data using an associative memory application that tags the at least one term of interest based on a generated identification score exceeding a predetermined threshold where the score is determined based on the number of matching terms between a segment of unstructured text and a segment of text in the associative memory application; and process the at least partially unstructured data using a regular expression processing program;

transmit the at least one data file including the at least partially structured data to the main application;

incorporate the at least partially structured data into the main application based at least in part on the tagged data, wherein incorporating the at least partially structured data includes at least one of including and excluding data based on existence of a tag;

display, at a user interface, the at least partially structured data, wherein at least partially structured data includes at least one segment of misidentified data that is at least one of incorrectly tagged and incorrectly not tagged;

receive, at the user interface, a user selection of at least one segment of misidentified data;

update the misidentified data to form re-identified data;

update the associative memory application to include the re-identified data that includes data that has been correctly tagged or correctly not tagged;

receive, at the data processing tool, text segments generated by parsing the at least partially unstructured data into discrete text segments;

identify one or more of the text segments as boilerplate data based on a comparison between the text segments and strings of text in a column incorporated in an associative memory application, wherein the text segments need not exactly match the strings of text in the associative memory application; and incorporate data including text segments parsed from the at least partially structured data into the main application, wherein the text identified as boilerplate data is excluded from the data incorporated into the main application.

12. One or more non-transitory computer-readable storage media having computer-executable instructions embodied thereon according to claim 11, wherein to process the at least partially unstructured data using an associative memory application, the computer-executable instructions cause the at least one processor to:

parse the at least partially unstructured data into one or more segments of the at least partially unstructured data;

query the associative memory application with at least one segment of the at least partially unstructured data;

generate a score associated with the at least one segment of the at least partially unstructured data and at least one segment of data in the associative memory application; and tag the at least one segment of the at least partially unstructured data based on the score.

13. One or more non-transitory computer-readable storage media having computer-executable instructions embodied thereon according to claim 11, wherein the computer-executable instructions cause the at least one processor to:

update the data processing tool based on the at least one segment of misidentified data.

14. One or more non-transitory computer-readable storage media having computer-executable instructions embodied thereon according to claim 11, wherein to process the at least partially unstructured data using a regular expression processing program, the computer-executable instructions cause the at least one processor to:

apply at least one source regular expression pattern to the at least partially unstructured data;

match at least one segment of the at least partially unstructured data to the at least one source regular expression pattern; and tag the at least one matched segment of the at least partially unstructured data.

15. One or more non-transitory computer-readable storage media having computer-executable instructions embodied thereon according to claim 11, wherein the computer-executable instructions cause the at least one processor to output the at least partially structured data to one of an output table and an output hypertext markup language (HTML) page.

16. A system for processing data, the system comprising:
a processing device;
a user interface communicatively coupled to said processing device; and
at least one of a memory communicatively coupled to said processing device and a communications interface communicatively coupled to said processing device, said processing device programmed to:

receive at least one data file including at least partially unstructured data from at least one of said memory and said communications interface, wherein the at least partially unstructured data includes actual data from a main application; and process the at least partially unstructured data using a data processing tool executing thereon to generate at least partially structured data that includes tagged data including a tag inserted to precede at least one identified term of interest by at least one of:

processing the at least partially unstructured data using an associative memory application executing thereon that tags the at least one term of interest based on a generated identification score exceeding a predetermined threshold where the score is determined based on the number of matching terms between a segment of unstructured text and a segment of text in the associative memory application; and processing the at least partially unstructured data using a regular expression processing program executing thereon; and incorporate the at least partially structured data into the main application based on the tagging, wherein incorporating the at least partially structured data includes at least one of including and excluding data based on existence of a tag; and display, at the user interface, the at least partially structured data, wherein at least partially structured data includes at least one segment of misidentified data that is at least one of incorrectly tagged and incorrectly not tagged;

receive a user selection of at least one segment of misidentified data;

update the misidentified data to form re-identified data;

update the associative memory application to include the re-identified data that includes data that has been correctly tagged or correctly not tagged;

receive, at the data processing tool, text segments generated by parsing the at least partially unstructured data into discrete text segments;

identify one or more of the text segments as boilerplate data based on a comparison between the text segments and strings of text in a column incorporated in an associative memory application, wherein the text segments need not exactly match the strings of text in the associative memory application; and incorporate data including text segments parsed from the at least partially structured data into the main application, wherein the text identified as boilerplate data is excluded from the data incorporated into the main application.

17. The system according to claim 16, wherein said processing device is further programmed to:
update the data processing tool executing thereon based on the at least one segment of misidentified data.

18. The system according to claim 16, wherein to process the at least partially unstructured data using an associative memory application, said processing device further programmed to:

parse the at least partially unstructured data into one or more segments of the at least partially unstructured data;

query the associative memory application executing thereon with at least one segment of the at least partially unstructured data;

generate a score associated with the at least one segment of the at least partially unstructured data and at least one segment of data in the associative memory application; and tag the at least one segment of the at least partially unstructured data based on the score.

19. The system according to claim 16, wherein to process the at least partially unstructured data using a regular expression processing program, said processing device further programmed to:

apply at least one source regular expression pattern to the at least partially unstructured data;

match at least one segment of the at least partially unstructured data to the at least one source regular expression pattern; and tag the at least one matched segment of the at least partially unstructured data.

20. The system according to claim 16, wherein said processing device further programmed to output the at least partially structured data to one of an output table in said memory and an output hypertext markup language (HTML) page for display via said user interface.

* * * * *